United States Patent
Omar (10) Patent No.: US 9,009,317 B2
(45) Date of Patent: Apr. 14, 2015

(54) SYSTEM FOR AND METHOD OF MANAGING NETWORK RESOURCES

(75) Inventor: Hassan M. Omar, Mt. Vernon, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 254 days.

(21) Appl. No.: 13/269,655

(22) Filed: Oct. 10, 2011

(65) Prior Publication Data

US 2013/0091283 A1    Apr. 11, 2013

(51) Int. Cl.
G06F 15/173    (2006.01)
G06F 15/16    (2006.01)
H04L 12/24    (2006.01)

(52) U.S. Cl.
CPC ........ *H04L 41/0893* (2013.01); *H04L 41/0896* (2013.01)

(58) Field of Classification Search
USPC ................................. 709/201–203, 217–229
See application file for complete search history.

(56) References Cited

U.S. PATENT DOCUMENTS

| | | | | |
|---|---|---|---|---|
| 2006/0143617 | A1* | 6/2006 | Knauerhase et al. | 718/104 |
| 2006/0171315 | A1* | 8/2006 | Choi et al. | 370/230 |
| 2007/0118636 | A1* | 5/2007 | Yang et al. | 709/223 |
| 2011/0110231 | A1* | 5/2011 | Langford et al. | 370/232 |
| 2012/0096167 | A1* | 4/2012 | Free et al. | 709/226 |

* cited by examiner

*Primary Examiner* — Yasin Barqadle (57) ABSTRACT

A system for and method of determining how to process a request for allocation network resource (whether to accept, deny or forward) is presented. The method may include receiving a request for allocating network resources from a user device. The method may also include determining, via at least one computer processor, whether to accept or deny the resource allocation request based at least in part on a classification of at least one of network elements and communication links, wherein the at least one network elements and communication links is identified based on the resource allocation request. The method may further include providing the determination of whether to accept or deny the resource allocation request to the user device. The system may utilize a dynamic set of policy, customized according to the current network status, to optimize the performance of processing the resource allocation request.

22 Claims, 5 Drawing Sheets

SYSTEM FOR AND METHOD OF MANAGING NETWORK RESOURCES

BACKGROUND INFORMATION

A network may include a plurality of network elements interconnected by communication channels that facilitate communications and sharing of resources among the plurality of network elements. The network resources may be managed by a network resource manager where the network may be modeled as a series of network elements interconnected by communication links. The network resource manager may assign an amount of resource to each individual network elements and communication links. The network resource manager may also include a set of policy rules that may be applied to each individual network elements and communication link. The network resource manager may allocate network resource when one or more resource allocation requests are received. However, the architecture and traffic pattern associated with each individual network elements may not play an active role or may not be relevant in the process of allocating network resources. Accordingly, the allocation of the network resources of a network by a network resource manager may be inefficient and may result in delays that may impact the performance of the network.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which.

DETAILED DESCRIPTION OF PREFERRED EMBODIMENTS

An embodiment provides a system and method for managing network resources to achieve predetermined operational and performance specifications for a communication network using a highly efficient approach. The resource management system may determine whether to accept or deny requests for allocating network resources, while optimizing a utilization rate of network elements. The resource management system may comprise a database storing a network topology model and network policies based at least in part on the network topology model. For example, a network element or an application may transmit a request for allocating network resources to the resource management system, the resource management system may determine a type of resource allocation request and/or an amount of network resources requested. The resource management system may determine whether to accept or deny the request for allocating network resources based at least in part on a set of network policy.

The resource management system may improve the efficiency of the allocation of the network resources with minimum amount of overhead (e.g., a number of signaling messages) with better performance metrics (e.g., reduced request processing time). For example, the resource management system may be implemented at various network elements in order to improve the efficiency of the allocation of the network resources within minimum amount of overhead and better performance metrics. The resource management system may be implemented at various network elements to determine whether to accept or deny requests for allocating network resources before the resource allocation request is transmitted to other network elements and thus reducing an amount of overhead in a communication network and thereby improving the performance.

Figure 1:
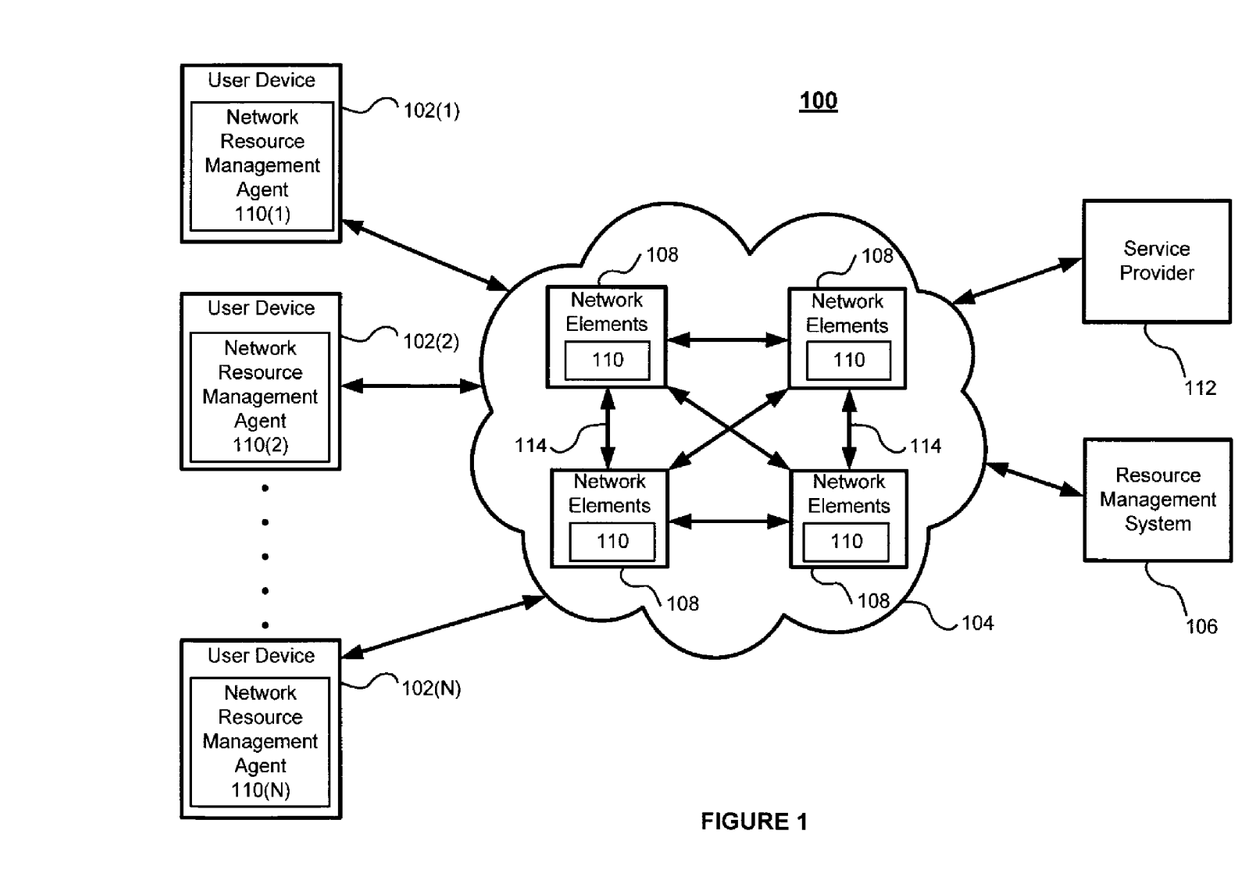
FIG. 1 is a schematic diagram illustrating a system for managing resources of a network according to a particular embodiment.

FIG. 1 is a schematic diagram illustrating a system for managing resources of a network according to a particular embodiment. As illustrated in FIG. 1, the system 100 for managing network resources may include a plurality of user devices 102(1-N) coupled to a resource management system 106 via a communication network 104. Each of the plurality of user devices 102(1-N) may include a network resource management agent 110(1-N) to facilitate the management of network resources. The communication network 104 may comprise a plurality of network elements 108 to communicatively couple the plurality of user devices 102(1-N) to the resource management system 106. As illustrated in FIG. 1, the network resource management agents 110(1-N) may be implemented in the plurality of user devices 102(1-N). In addition, the network resource management agents, represented by 110, may be implemented in the plurality of network elements 108 of the communication network 104.

The resource management system 106 and/or the network resource management agent 110 may efficiently allocate network resource to the plurality of user devices 102(1-N). For example, the plurality of user devices 102(1-N), or an application running on the user device, may transmit a request for allocating network resources to the resource management system 106 via the communication network 104. In an exemplary embodiment, the resource management system 106 may determine whether to accept or deny the request for allocation of network resources by applying dynamic network policies based at least in part on the network model topology to minimize processing time of the request for allocation of network resources. In another exemplary embodiment, the network resource management agent 110 may locally determine whether to deny, accept or forward the request for allocation of network resources to the resource management system 106 or other network resource management agents to reduce or minimize the amount of overhead (e.g., a number of signaling messages) within the communication network 104.

An embodiment of the present invention is directed to using a network resource management agent as a distributed approach to enhance the efficiency of resource management. Network resource management agents may be located on, or otherwise associated with, network elements for performance improvement. For example, a centralized resource manager may cooperate with distributed network resource management agents. In addition, a resource manager may activate or deactivate one or more network resource management agents based on various factors, such as network conditions. The network resource management agents may also activate and/ or deactivate themselves based on criteria provided by the resource management system or other source. The resource management system and the network resource management agents may proceed to a mode where new requests may be processed as soon as current utilization associated with certain elements and links are in a critical category. Thus, processing of new resource allocation requests may proceed immediately after an update of utilization of the critical category and may be completely independent of the update to a standard category. The contents of the policy list, applied to a resource allocation request, may be dynamic and optimized to include relevant elements such that the performance is improved. The network resource management agents may have different capabilities depending on what the resource manager allows or authorizes them to do. A network resource management agent may have the ability to monitor and manipulate requests and responses for resource allocation, which may be sent to it or intercepted by it, for example. Also, the application or network device which generated the request may be able to handle receiving a response (or a manipulated response) from a network resource management agent, even where the identity of the responding network resource management agent may not be known in advance.

The plurality of user devices 102(1-N) may be a mobile user device, a computer, a personal computer, a laptop, a cellular communication device, a workstation, a mobile device, a phone, a television, a handheld PC, a personal digital assistant (PDA), a thin system, a fat system, a network appliance, an Internet browser, or other any other device that may be in communication with the resource management system 106 via the communication network 104. Other user devices 102(1-N) may be one or more intermediary devices or applications that may communicate with the communication network 104, such as a transmitter/receiver, router, modem, or a set-top box. The plurality of user devices 102(1-N) may be coupled to the resource management system 106 via a wired link. In another exemplary embodiment, the plurality of user devices 102(1-N) may be coupled to the resource management system 106 via a wireless link.

The communication network 104 may couple the plurality of user devices 102(1-N) to the resource management system 106. The communication network 104 may be a wireless network, a wired network or any combination of wireless network and wired network. For example, the communication network 104 may include one or more of a fiber optics network, a passive optical network, a cable network, an Internet network, a satellite network (e.g., operating in Band C, Band Ku or Band Ka), a wireless LAN, a Global System for Mobile Communication (GSM), a Personal Communication Service (PCS), a long term evolution (LTE), a Personal Area Network (PAN), D-AMPS, Wi-Fi, Fixed Wireless Data, IEEE 802.11a, 802.11b, 802.15.1, 802.181n and 802.11g or any other wired or wireless network for transmitting and receiving a data signal. In addition, the communication network 104 may include, without limitation, telephone line, fiber optics, IEEE Ethernet 802.3, wide area network (WAN), local area network (LAN), or global network such as the Internet. The communication network 104 may support an Internet network, a wireless communication network, a cellular network, or the like, or any combination thereof.

The communication network 104 may further include one, or any number of the exemplary types of networks mentioned above operating as a stand-alone network or in cooperation with each other. Although the communication network 104 is depicted as one network, it should be appreciated that according to one or more embodiments, the communication network 104 may comprise a plurality of interconnected networks, such as, for example, a service provider network, the Internet, a broadcaster's network, a cable television network, corporate networks, and home networks.

The resource management system 106 may include one or more servers. For example, the resource management system 106 may include a UNIX based server, Windows 2000 Server, Microsoft IIS server, Apache HTTP server, API server, Java sever, Java Servlet API server, ASP server, PHP server, HTTP server, Mac OS X server, Oracle server, IP server, or other independent server to support operations of a client. Also, the resource management system 106 may include one or more Internet Protocol (IP) network server or public switch telephone network (PSTN) server. The resource management system 106 may include one or more databases for storing a network model topology and network policies based at least in part on the network model topology.

The network elements 108 of the communication network 104 may include core network devices, aggregation network devices, gateway network devices, and/or transport network devices. The network elements 108 may comprise addressable, manageable hardware device(s) and associated software that may perform a telecommunication service function. Network elements 108 may include, without limitation: devices associated with level one of the Open Systems Interconnection (OSI) reference model such as add/drop multiplexers, optical add/drop multiplexers, and/or like devices; devices associated with level two of the Open Systems Interconnection (OSI) reference model such as an asynchronous transfer mode (ATM) switch and/or any other like device; devices associated with level three of the Open Systems Interconnection (OSI) reference model such as routers, switches, and or any other like devices; and/or any other computer networking device that may transmit data across the communication network 104. In various exemplary embodiments, network elements 108 may also represent, for example, automated telephone exchanges, digital switches, and/or other like devices associated with the public switch telephone network (PSTN). In an exemplary embodiment, the network elements 108 may include switches, gateway devices, routers, transmitters/receivers, relays, servers, registry, multiplexer, signal converter, and/or other devices that may couple the plurality of user devices 102(1-N) to the resource management system 106.

The service provider 112 may include one or more servers to provide service to the plurality of user devices 102(1-N) via the communication network 104. For example, the service provider 112 may include a UNIX based server, Windows 2000 Server, Microsoft IIS server, Apache HTTP server, API server, Java sever, Java Servlet API server, ASP server, PHP server, HTTP server, Mac OS X server, Oracle server, IP server, or other independent server to provide one or more contents to the plurality of user devices 102(1-N). Also, the service provider 112 may include one or more Internet Protocol (IP) network server or public switch telephone network (PSTN) server.

The service provider 112 may include one or more storage devices including, without limitation, paper card storage, punched card, tape storage, paper tape, magnetic tape, disk storage, gramophone record, floppy disk, hard disk, ZIP disk, holographic, molecular memory. The one or more storage devices may also include, without limitation, optical disc, CD-ROM, CD-R, CD-RW, DVD, DVD-R, DVD-RW, DVD+R, DVD+RW, DVD-RAM, Blu-ray, Minidisc, HVD and Phase-change Dual storage device. The one or more storage devices may further include, without limitation, magnetic bubble memory, magnetic drum, core memory, core rope memory, thin film memory, twistor memory, flash memory, memory card, semiconductor memory, solid state semiconductor memory or any other like mobile storage devices.

The service provider 112 may include one or more servers that provide various services to user devices 102(1-N). The service providers may include, but not limited to, a radio company, a fiber optics company, a cable company (e.g., Cox Communication, Comcast Corp, and/or Adelphia Communication Corp), a satellite company (e.g., DirecTV and/or Dish Network), a broadcasting company (e.g., National Broadcasting Company (NBC), American Broadcasting Company (ABC), Fox Broadcasting Company (FOX), and/or Columbia Broadcasting System (CBS)) and/or other radio/television broadcasting companies. The content providers may also include, but not limited to, an Internet content providers, telephone service provider, television service provider, and/or other content service providers. Moreover, the content providers may be over-the top content providers including Netflix®, Blockbuster®, or RedBox®.

The communication links 114 may be a communication channel within the communication network 104 that may connect the network elements 108. The communication links 114 may include physical communication links or logical communication links, or a combination of the physical communication links and the logical communication links. In an exemplary embodiment, the communication links 114 may be, for example, but not limited to, a data link, uplink, downlink, fiber optics link, point-to-point link, wireless link, wired links, and/or other communication links that connect the network elements 108.

Figure 2:
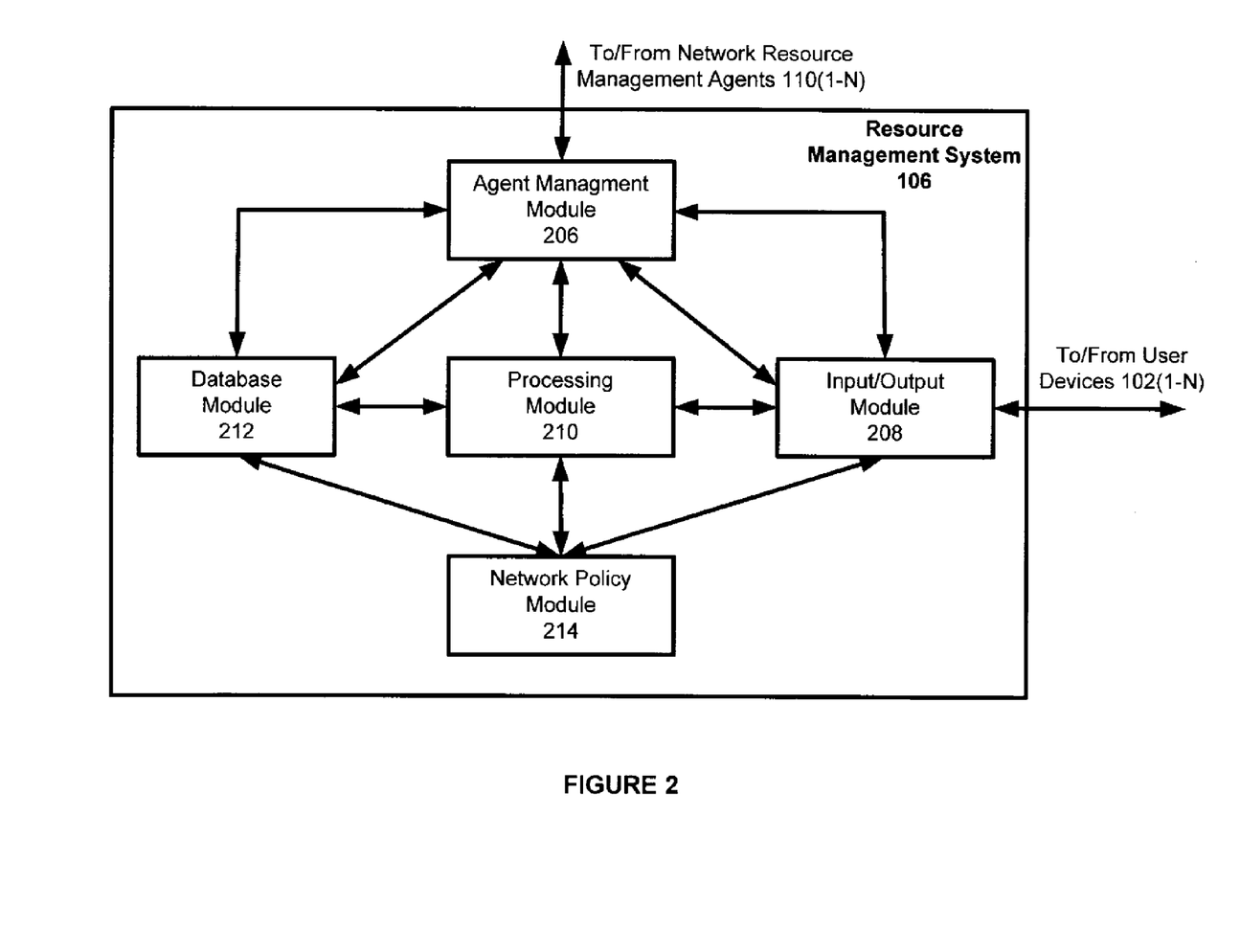
FIG. 2 is a block diagram of hardware elements of a resource management system of a particular embodiment.

FIG. 2 is a block diagram of hardware elements of the resource management system 106 of a particular embodiment. The resource management system 106 may include an agent management module 206, an input/output (I/O) module 208, a processing module 210, a database module 212, or a network policy module 214. It is noted that the modules 206, 208, 210, 212, and 214 are exemplary and the functions performed by one or more of the modules may be combined with that performed by other modules. The functions described herein as being performed by the modules 206, 208, 210, 212, and 214 also may be separated and may be located or performed by other modules. Moreover, the modules 206, 208, 210, 212, and 214 may be implemented at other devices of the system 100 (e.g., the plurality of user devices 102(1-N), the communication network 104, or the network elements 108).

The agent management module 206 may comprise at least one computer processor for providing an interface between the network resource management agents 110 and the resource management system 106. The agent management module 206 may include a user interface, e.g., a graphical user interface, to receive one or more queries/requests from the network resource management agents 110(1-N) to minimize an amount of overhead within the communication network 104. The agent management module 206 may provide a separate or a unified graphical user interface. The agent management module 206 may include an Application Programming Interface (API) to interact with the plurality of network resource management agents 110(1-N). In an exemplary embodiment, the agent management module 206 may receive one or more requests or queries for permission to deny or forward requests for allocating network resources. In another exemplary embodiment, the agent management module 206 may receive one or more requests or queries to update network policies stored at the agent management module 206.

In response to receiving requests or queries from the network resource management agents 110(1-N), the agent management module 206 may provide the request or queries to the input/output (I/O) module 208, the processing module 210, the database module 212, and the network policy module 214. For example, the agent management module 206 may provide the requests or queries to the processing module 210 for processing to determine whether to grant the network resource management agents 110(1-N) permission to deny or forward the request for allocating network resources. The agent management module 206 may also provide the requests or queries to the database module 212 and for storage. The agent management module 206 may provide the requests or queries to the network policy module 214 to determine whether to update the network policies stored at the network resource management agents 110(1-N).

The agent management module 206 may provide a response to the plurality of network resource management agents 110(1-N). For example, the agent management module 206 may instruct the network resource management agents 110(1-N) how to determine whether to deny or forward the request for allocating network resources to the resource management system 106. In another exemplary embodiment, the agent management module 206 may provide updated network model topology and network policies based at least in part on the network model topology to the network resource management agents 110(1-N). The agent management module 206 may provide instructions to the network resource management agents 110(1-N) to turn the network resource management agents 110(1-N) to an "ON" state or an "OFF" state, depending on dynamics associated with the network utilization.

The input/output (I/O) module 208 may include network ports, routers, repeater, antennas, USB ports, or other transceiver device for transmitting data to and receiving data from the plurality of user devices 102(1-N). For example, the input/output (I/O) module 208 may receive requests or queries for allocating network resources from the plurality of user devices 102(1-N). For example, the input/output (I/O) module 208 may establish a communication path with the plurality of user devices 102(1-N) and receive request for allocating network resources. The request for allocating network resources may include type of services requested (e.g., Video on Demand (VOD), IPTV, Audio/Video Conferencing, content distribution, webcast and distant learning applications). The request for allocating network resources may also include identification information associated with plurality of user devices 102(1-N), for example, IP address, media access control (MAC) address, uniform resource locator (URL), uniform resource identifiers (URI), telephone number, set-top box number, and/or other identification number associated with the plurality of user devices 102(1-N). The request for allocating network resource may further identify network resources requested, for example, a type of communication services (e.g., Internet, satellite, cable, fiber optics, telephone line), an amount of bandwidth (e.g., 15 Mbps), protocols of the network resource, one or more network elements associated with a communication path, one or more communication links along a communication path, and/or other identification information of the network resources. The request for allocating network resource may further include an identification field to help associate the request with corresponding responses.

The input/output (I/O) module 208 may preprocess the resource allocation request received from the plurality of user devices 102(1-N) (e.g., filter, sort, format, and aggregate). In an exemplary embodiment, the preprocessing of the resource allocation request received by the input/output (I/O) module 208 may include filtering the resource allocation requests and eliminating erroneous or defective resource allocation requests, sorting the resource allocation requests, formatting the resource allocation requests into desired format (e.g., identify various portions of the resource allocation requests), and aggregating the resource allocation requests received from plurality of user devices 102(1-N).

The resource allocation request may be transferred from the input/output (I/O) module 208 to the processing module 210 for processing. The processing module 210 may process the resource allocation request to determine whether to accept or deny the resource allocation request. The processing module 210 may include at least one computer processor or a plurality of sub-analytical modules having a computer processor to perform various operations. For example, the processing module 210 may identify an amount of network resource requested associated with the resource allocation request transmitted by the plurality of user devices 102(1-N). The processing module 210 may identify a communication path between the plurality of user devices 102(1-N) and the service provider 112 based at least in part on the resource allocation request. For example, the processing module 210 may identify one or more network elements 108 and/or communication links 114 along the communication path between the plurality of user devices 102(1-N) and the service provider 112.

The processing module 210 may identify a classification of the one or more network elements 108 and/or the communication links 114 along the communication path between the plurality of user devices 102(1-N) and the service provider 112. For example, the one or more network elements 108 and/or the communication links 114 may be classified into a plurality of categories based at least in part on a utilization rate. In an exemplary embodiment, the one or more network elements 108 and/or the communication links 114 may be classified as a priority category when the one or more network elements 108 and/or the communication links 114 reach a predetermined utilization rate (e.g., 75%). In another exemplary embodiment, the one or more network elements 108 and/or the communication links 114 may be classified as a standard category when the one or more network elements 108 and/or the communication links 114 remain below a predetermined utilization rate (e.g., 60%).

The processing module 210 may dynamically apply a corresponding set of network policies to determine whether to accept or deny the resource allocation request. For example, the processing module 210 may access the network policy module 214 to identify a corresponding set of network policies based at least in part on the current network status such as current utilization of one or more network element or link. The processing module 210 may identify a corresponding set of network policies based at least in part on a classification of the network elements 108 and/or the communication links 114 of the resource allocation request. In an exemplary embodiment, the processing module 210 may only identify a set of network policies corresponding to the network elements 108 and/or the communication links 114 classified as the priority category. The network policies associated with the network elements 108 and/or the communication links 114 classified as the standard category may not be identified because the utilization rate is below the predetermined utilization rate. Accordingly, a number of network policies used to process the resource allocation request may be changed based on the condition of the communication network 104 at a point in time. Also, the number of network policies used to process the resource allocation request may be reduced because the processing module 210 may only utilize the network policies associated with the network elements 108 and/or the communication links 114 classified as the priority category and thus reducing the response time and improve the efficiency of the resource management system 106.

The processing module 210 may determine whether to accept or deny the resource allocation request based at least in part on the classification and current utilization of the network elements 108 and/or the communication links 114. In an exemplary embodiment, the processing module 210 may automatically accept the resource allocation request when the network elements 108 and/or the communication links 114 along a communication path between the plurality of user devices 102(1-N) and the service provider 112 are classified as a standard category. For example, the processing module 210 may provide an acceptance response to the plurality of user devices 102(1-N) without inspecting the policy rules and without waiting for updating network topology model stored in the database module 212. In another exemplary embodiment, the processing module 210 may apply a corresponding set of network policy to determine whether to accept or deny the resource allocation request when the network elements 108 and/or the communication links 114 along the communication path between the plurality of user devices 102(1-N) and the service provider 112 are classified as a priority category. For example, the processing module 210 may determine to accept the resource allocation request, the processing module 210 may provide an acceptance response to the plurality of user devices 102(1-N) after updating the network topology model stored in the database module 212. For example, the immediate updating of the network topology model stored in the database module 212 may be required for elements classified as priority category in order to ensure the accuracy of the utilization rate of the network elements 108 and/or the communication links 114 when processing subsequent resource allocation requests. A delay (e.g., after providing acceptance response) in updating the network topology model stored in the database module 212 may be tolerable for the network elements 108 and/or the communication links 114 classified as the standard category because the utilization rate is below the predetermined utilization rate and thus may not impact the accuracy of subsequent resource allocation requests. For example, new allocation requests may be processed immediately after updating the current allocated resources for the priority category. There is no need to wait for updating the current allocated resources for the standard category.

The database module 212 may store and manage network topology model of the communication network 104 and utilization rate of the network elements 108 and/or the communication links 114. For example, the resource allocation request may be received from the plurality of user devices 102(1-N) by the input/output (I/O) module 208 and may be stored in the database module 212. The database module 212 may also receive a network topology model and updates of the network topology model from the processing module 210. The database module 212 may further receive updated utilization rate of network elements 108 and/or communication links 114 from the processing module 210.

Various modules of the resource management system 106 may access the database module 212 to obtain network topology model and/or the utilization rate of network elements 108 and/or the communication links 114. For example, the processing module 210 may access the database module 212 to obtain the utilization rate of one or more network elements 108 and/or the communication links 114 along a communication path between the plurality of user devices 102(1-N) and the service provider 112. The network policy module 214 may also access the database module 212 to obtain the classification of the network elements 108 and/or the communication links 114 of the communication network 104.

The database module 212 may be network accessible storage and may be local, remote, or a combination thereof to modules 206, 208, 210, and/or 214. The database module 212 may utilize a redundant array of inexpensive disks (RAID), tape, disk, a storage area network (SAN), an internet small computer systems interface (iSCSI) SAN, a Fibre Channel SAN, a common Internet File System (CIFS), network attached storage (NAS), a network file system (NFS), or other computer accessible storage. In one or more embodiments, database module 212 may be a database, such as an Oracle® database, a Microsoft® SQL Server database, a DB2 database, a MySQL® database, a Sybase® database, an object oriented database, a hierarchical database, or other database. The database module 212 may utilize flat file structures for storage of data.

The network policy module 214 may comprise at least one computer processor and/or a database to process and store the network policies of the communication network 104. The network policies may allow the resource management system 106 to determine whether to accept or deny resource allocation requests received from the plurality of user devices 102(1-N). The network policy module 214 may comprise network policies for the plurality of categories of network elements 108 and/or the communication links 114. The network policies of the communication network 104 may be sets of conditions, constraints, and settings that may be applied to determine whether resource allocation requests may be accepted or denied.

For example, the network policy module 214 may comprise network policies for the standard category of network elements 108 and/or the communication links 114. Also, the network policy module 214 may comprise network policies for the priority category of the network elements 108 and/or the communication links 114. The network policy module 214 may receive updated network policies of the network elements 108 and/or the communication links 114 of the communication network 104.

Figure 3:
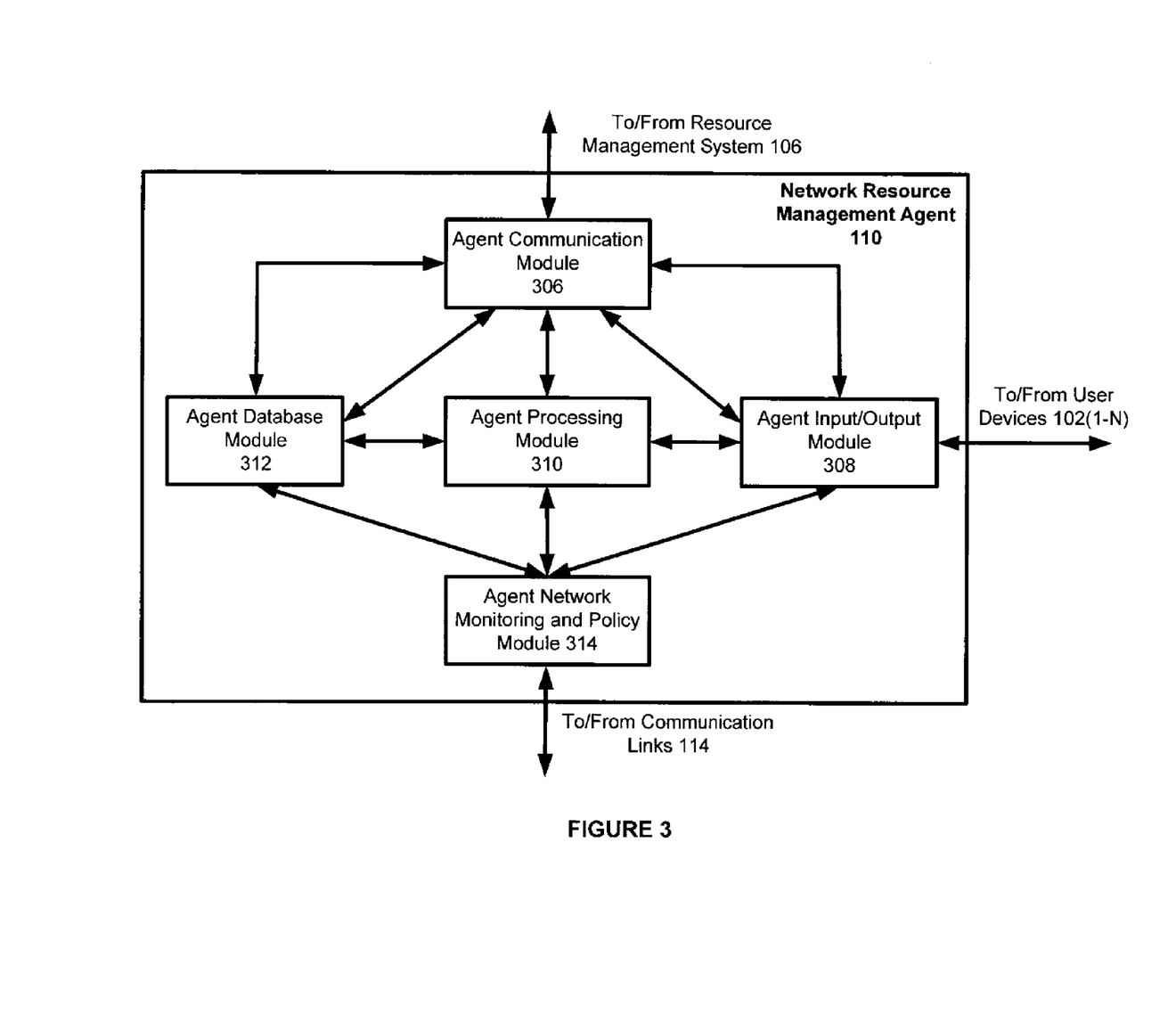
FIG. 3 is a block diagram of hardware elements of a network resource management agent of a particular embodiment.

FIG. 3 is a block diagram of hardware elements of the network resource management agent 110 of a particular embodiment. The network resource management agent 110 may include an agent communication module 306, an agent input/output (I/O) module 308, an agent processing module 310, an agent database module 312, or an agent network monitoring and policy module 314. It is noted that the modules 306, 308, 310, 312, and 314 are exemplary and the functions performed by one or more of the modules may be combined with that performed by other modules. The functions described herein as being performed by the modules 306, 308, 310, 312, and 314 also may be separated and may be located or performed by other modules. In an exemplary embodiment, the network resource management agent 110 may be integrated with each of the plurality of user devices 102(1-N). In another exemplary embodiment, the network resource management agent 110 may be implemented as a separate system from the plurality of user devices 102(1-N). Moreover, the modules 306, 308, 310, 312, and 314 of the network resource management agent 110 may be implemented at other devices of the system 100 (e.g., the communication network 104, the resource management system 106, the network elements 108, and/or the service provider 112).

The agent communication module 306 may comprise at least one computer processor for providing an interface between the network resource management agents 110 and the resource management system 106. The agent communication module 306 may include a user interface, e.g., a graphical user interface, to receive one or more queries/requests and/or provisioning requests from the resource management system 106 to minimize an amount of overhead within the communication network 104. The agent communication module 306 may provide a separate or a unified graphical user interface. The agent communication module 306 may include an Application Programming Interface (API) to interact with the resource management system 106. In an exemplary embodiment, the agent communication module 306 may provide one or more requests or queries to the resource management system 106 for permission to process resource allocation requests from the plurality of user devices 102(1-N). In an exemplary embodiment, the resource management system 106 may provision the network resource management agent 110 through the agent communication module 306. In another exemplary embodiment, the agent communication module 306 may periodically transmit one or more requests or queries to the resource management system 106 for permission to process resource allocation requests from the plurality of user devices 102(1-N). The agent communication module 306 may also receive one or more responses from the resource management system 106 to accept or deny the request to process resource allocation requests. The agent communication module 306 may receive a request to from the resource management system 106 to turn the network resource management agents 110(1-N) to an "ON" state or an "OFF" state. Further, the resource management system 106 may authorize the agent communication module 306 to take a local decision, based on current network status, regarding the agent turning itself to an "ON" state or an "OFF" state.

In response to receiving responses from the resource management system 106, the agent communication module 306 may provide the response to the agent input/output (I/O) module 308, the agent processing module 310, the agent database module 312, and the agent network monitoring and policy module 314. For example, the agent communication module 306 may provide the response to the agent processing module 310 to process the resource allocation requests to determine whether to accept or deny the resource allocation requests. The agent communication module 306 may also provide the response to the agent database module 312 and store the response. The agent communication module 306 may communicate with the agent network monitoring and policy module 314 to determine utilization rates of one or more network elements 108 and/or the communication links 114.

The agent input/output (I/O) module 308 may include network ports, routers, repeater, antennas, USB ports, or other transceiver device for transmitting data to and receiving data from the plurality of user devices 102(1-N). For example, the agent input/output (I/O) module 308 may receive requests or queries for allocating network resources from the plurality of user devices 102(1-N). For example, the agent input/output (I/O) module 308 may establish a communication path with the plurality of user devices 102(1-N) and receive request for allocating network resources. The request for allocating network resources may include type of services requested (e.g., Video on Demand (VOD), IPTV, Audio/Video Conferencing, content distribution, webcast and distant learning applications). The request for allocating network resources may also include identification information associated with plurality of user devices 102(1-N), for example, IP address, media access control (MAC) address, uniform resource locator (URL), uniform resource identifiers (URI), telephone number, set-top box number, and/or other identification number associated with the plurality of user devices 102(1-N). The request for allocating network resource may further identify network resources requested, for example, a type of communication services (e.g., Internet, satellite, cable, fiber optics, telephone line), an amount of bandwidth (e.g., 15 Mbps), protocols of the network resource, one or more network elements associated with a communication path, one or more communication links along a communication path, and/or other identification information of the requested content and/or network resources. The request for allocating network resource may further include an identification field to help with associating the request with corresponding responses.

The agent input/output (I/O) module 308 may preprocess the resource allocation request received from the plurality of user devices 102(1-N) (e.g., filter, sort, format, aggregate, etc.). In an exemplary embodiment, the preprocessing of the resource allocation request received by the agent input/output (I/O) module 308 may include filtering the resource allocation requests and eliminating erroneous or defective resource allocation requests, sorting the resource allocation requests, formatting the resource allocation requests into desired format (e.g., identify various portions of the resource allocation requests), and aggregating the resource allocation requests received from plurality of user devices 102(1-N).

The resource allocation request may be transferred from the agent input/output (I/O) module 308 to the agent processing module 310 for processing. The agent processing module 310 may process the resource allocation request to determine whether to accept or deny the resource allocation request. The agent processing module 310 may include at least one computer processor or a plurality of sub-analytical modules having a computer processor to perform various operations. For example, the agent processing module 310 may identify an amount of network resource requested associated with the resource allocation request transmitted by the plurality of user devices 102(1-N). The agent processing module 310 may identify a communication path between the plurality of user devices 102(1-N) and the service provider 112 based at least in part on the resource allocation request. For example, the agent processing module 310 may identify one or more network elements 108 and/or communication links 114 along the communication path between the plurality of user devices 102(1-N) and the service provider 112.

The agent processing module 310 may identify a utilization rate of the one or more network elements 108 and/or the communication links 114 along the communication path between the plurality of user devices 102(1-N) and the service provider 112. In an exemplary embodiment, the agent processing module 310 may identify a utilization rate of one or more network elements 108 and/or communication links 114 along the communication path directly coupled to the network resource management agent 110. For example, the one or more network elements 108 and/or the communication links 114 may be classified into a plurality of categories based at least in part on a utilization rate. In an exemplary embodiment, the one or more network elements 108 and/or the communication links 114 may be classified as priority category when the one or more network elements 108 and/or the communication links 114 reach a predetermined utilization rate (e.g., 75%). In another exemplary embodiment, the one or more network elements 108 and/or the communication links 114 may be classified as standard category when the one or more network elements 108 and/or the communication links 114 remain below a predetermined utilization rate (e.g., 60%).

The agent processing module 310 may determine whether to accept or deny the resource allocation request based at least in part on the categorization of the one or more network elements 108 and/or the communication links 114. For example, the agent processing module 310 may determine the action taken regarding the request (e.g., whether to accept, deny or forward the resource allocation request) based at least in part on the categorization of the one or more network elements 108 and/or the communication links 114 directly coupled to the network resource management agent 110. The agent processing module 310 may access the agent network monitoring and policy module 314 to identify the categorization of the one or more network elements 108 and/or the communication links 114 directly coupled to the resource network management agent 110. The agent processing module 310 may determine whether to accept or deny the resource allocation request based at least in part on the categorization of the one or more network elements 108 and/or the communication links 114 within the scope of the network resource management agent 110.

In an exemplary embodiment, the agent processing module 310 may determine to accept the resource allocation request when the one or more network elements 108 and/or the communication links 114 within the scope of the network resource management agent 110 are classified as standard category. In another exemplary embodiment, the agent processing module 310 may determine to deny the resource allocation request when the one or more network elements 108 and/or the communication links 114 within the scope of the network resource management agent 110 are classified as priority category. The agent processing module 310 may allow early determination of the resource allocation request before the resource allocation request propagates to the resource management system 106. Thus, the agent processing module 310 may prevent further propagation of the resource allocation request and reduce the signaling and processing overhead at subsequent network elements 108 or at resource management system 106.

The agent processing module 310 may determine whether to accept or deny the resource allocation request based at least in part on the utilization rate of the network elements 108 and/or the communication links 114 within the scope of the network resource management agent 110. In an exemplary embodiment, the agent processing module 310 may accept the resource allocation request when the resource allocation request does not exceed the maximum utilization rate of the network elements 118 and/or the communication links 114 within the scope of the network resource management agent 110 along a communication path between the plurality of user devices 102(1-N) and the service provider 112. In another exemplary embodiment, the agent processing module 310 may deny the resource allocation request when the resource allocation request exceeds the maximum utilization rate of the network elements 108 and/or the communication links 114 directly coupled to the network resource management agent 110 along a communication path between the plurality of user devices 102(1-N) and the service provider 112.

The agent database module 312 may store and manage the utilization rate of the network elements 108 and/or the communication links 114. For example, the resource allocation request may be received from the plurality of user devices 102(1-N) by the agent input/output (I/O) module 308 may be stored in the agent database module 312. The agent database module 312 may also receive a network topology model and updates of the network topology model. The agent database module 312 may further receive updated utilization rate of network elements 108 and/or communication links 114 from the agent processing module 310.

Various modules of the network resource management agent 110 may access the agent database module 312 to obtain network topology model and/or the utilization rate of network elements 108 and/or the communication links 114. For example, the agent processing module 310 may access the agent database module 312 to obtain the utilization rate of one or more network elements 108 and/or the communication links 114 along a communication path between the plurality of user devices 102(1-N) and the service provider 112. The agent network monitoring and policy module 314 may also access the agent database module 312 to obtain the network topology of the communication network 104.

The agent database module 312 may be network accessible storage and may be local, remote, or a combination thereof to modules 306, 308, 310, and/or 314. The agent database module 312 may utilize a redundant array of inexpensive disks (RAID), tape, disk, a storage area network (SAN), an internet small computer systems interface (iSCSI) SAN, a Fibre Channel SAN, a common Internet File System (CIFS), network attached storage (NAS), a network file system (NFS), or other computer accessible storage. In one or more embodiments, agent database module 312 may be a database, such as an Oracle® database, a Microsoft® SQL Server database, a DB2 database, a MySQL® database, a Sybase® database, an object oriented database, a hierarchical database, or other database. The agent database module 312 may utilize flat file structures for storage of data.

The agent network monitoring and policy module 314 may comprise at least one computer processor and/or a database to monitor utilization rate of the network elements 108 and/or the communication links 114. The agent network monitoring and policy module 314 may transmit a status request message to one or more network elements 108 and/or the communication links 114 in order to determine a utilization rate of the one or more network elements 108 and/or the communication links 114. For example, the agent network monitoring and policy module 314 may periodically (e.g., every second, minute, hour) transmit a status request message to the network elements 108 and/or the communication links 114 directly coupled to the network resource management agent 110. The agent network monitoring and policy module 314 may transmit a status request message to the network elements 108 and/or the communication links 114 based at least in part on a reception of the resource allocation requests. For example, the agent network monitoring and policy module 314 may transit a status request message to the network elements 108 and/or the communication links 114 along a communication path of the resource allocation request. The agent network monitoring and policy module 314 may provide the utilization rate of the network elements 108 and/or the communication links 114 to the agent database module 312 and stored. The network monitoring module also is capable of evaluating policy rules to support taking decisions within its scope.

Figure 4:
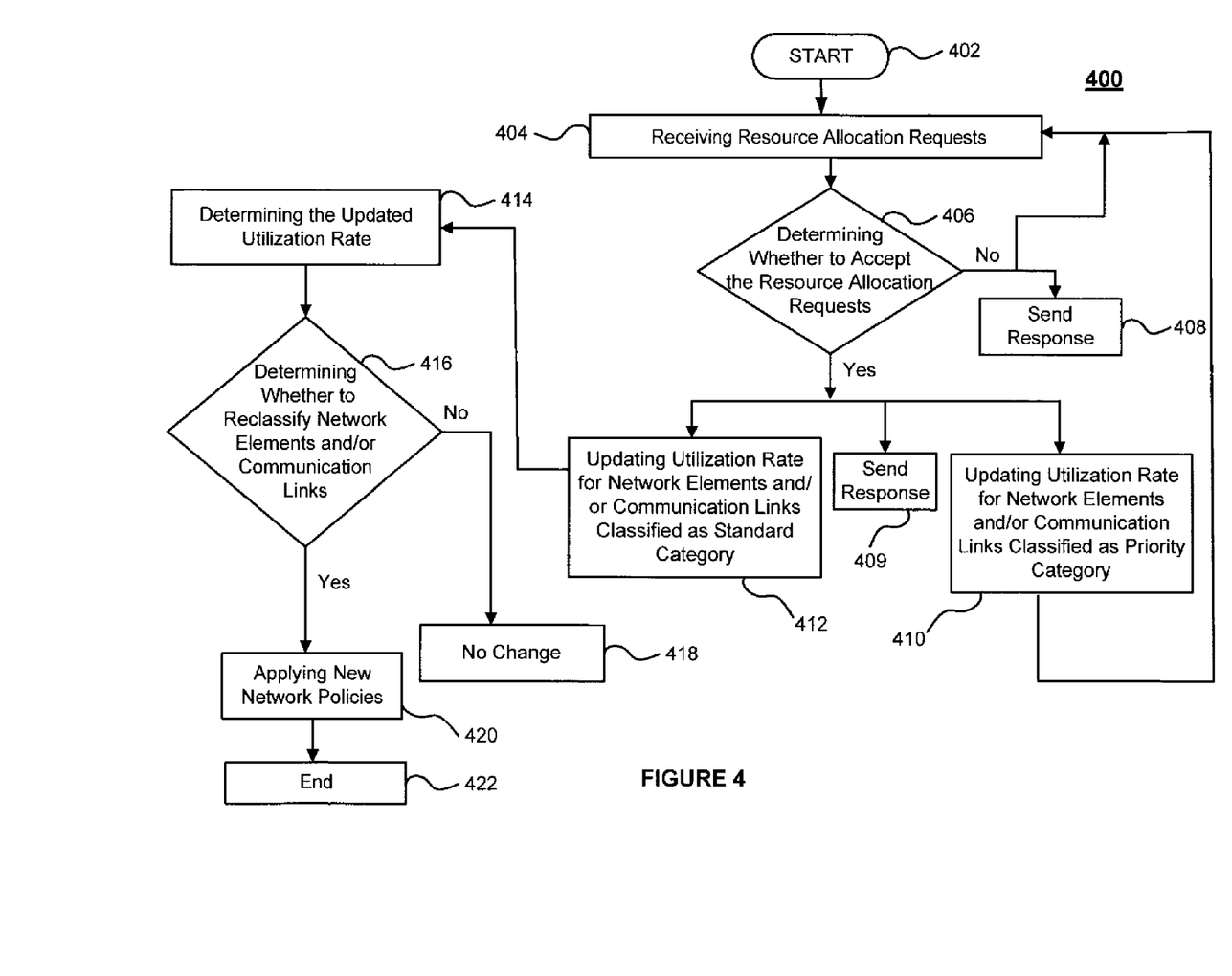
FIG. 4 is a flowchart illustrating the functionality of a resource management system for determining whether to accept or deny a resource allocation request of a particular embodiment.

FIG. 4 is a flowchart illustrating the functionality of a resource management system 106 for determining whether to accept or deny a resource allocation request of a particular embodiment. This exemplary method 400 may be provided by way of example, as there are a variety of ways to carry out the method. The method 400 shown in FIG. 4 can be executed or otherwise performed by one or a combination of various systems. The method 400 is described below may be carried out by the system and network shown in FIGS. 1 and 2, by way of example, and various elements of the resource management system 106 and communication network 104 are referenced in explaining the example method of FIG. 4. Each block shown in FIG. 4 represents one or more processes, methods or subroutines carried out in exemplary method 400. Referring to FIG. 4, exemplary method 400 may begin at block 402.

At block 402, the method 400 for determining whether to accept or deny resource allocation requests may begin.

At block 404, the input/output module (I/O) module 208 may receive resource allocation requests from the plurality of user devices 102(1-N). For example, the input/output (I/O) module 208 may establish a communication path with the plurality of user devices 102(1-N) and receive requests for allocating network resources. The request for allocating network resources may include type of services requested (e.g., Video on Demand (VOD), IPTV, Audio/Video Conferencing, content distribution, webcast and distant learning applications). The request for allocating network resources may also include identification information associated with plurality of user devices 102(1-N), for example, IP address, media access control (MAC) address, uniform resource locator (URL), uniform resource identifiers (URI), telephone number, set-top box number, and/or other identification number associated with the plurality of user devices 102(1-N). The request for allocating network resource may further identify network resources requested, for example, a type of communication services (e.g., Internet, satellite, cable, fiber optics, telephone line), an amount of bandwidth (e.g., 15 Mbps), protocols of the network resource, one or more network elements associated with a communication path, one or more communication links along a communication path, and/or other identification information of the network resources. The request for allocating network resource may further include an identification field to help with associating the request with the corresponding responses. After receiving the resource allocation request at the input/output (I/O) module 208, the method 400 may proceed to block 406.

At block 406, the processing module 210 may determine whether to accept or deny the request for allocating network resource. The resource allocation request may be transferred from the input/output (I/O) module 208 to the processing module 210 for processing. The processing module 210 may process the resource allocation request to determine whether to accept or deny the resource allocation request. For example, the processing module 210 may identify an amount of network resource requested associated with the resource allocation request transmitted by the plurality of user devices 102(1-N). The processing module 210 may identify a communication path between the plurality of user devices 102(1-N) and the service provider 112 based at least in part on the resource allocation request. For example, the processing module 210 may identify one or more network elements 108 and/or communication links 114 along the communication path between the plurality of user devices 102(1-N) and the service provider 112.

The processing module 210 may identify a classification of the one or more network elements 108 and/or the communication links 114 along the communication path between the plurality of user devices 102(1-N) and the service provider 112 based at least in part on an utilization rate. The processing module 210 may apply a corresponding dynamic set of network policies to determine whether to accept or deny the resource allocation request based at least in part on the classification of the one or more network elements 108 and/or the communication links 114. For example, the processing module 210 may access the network policy module 214 to identify a corresponding set of network policies based at least in part on the classification of the one or more network elements 108 and/or the communication links 114 identified by the resource allocation request.

In an exemplary embodiment, the processing module 210 may identify a limited set of network policies. For example, the processing module 210 may only identify a set of network policies corresponding to the network elements 108 and/or the communication links 114 classified as the priority category. The network policies associated with the network elements 108 and/or the communication links 114 classified as the standard category may not be identified because the utilization rate is below the predetermined utilization rate. Accordingly, a number of network policies used to process the resource allocation request may be changed based on the condition of the communication network 104 at a point in time. Also, the number of network policies used to process the resource allocation request may be reduced because the processing module 210 may be limited to only utilize the network policies associated with the network elements 108 and/or the communication links 114 classified as the priority category and thus reducing the response time and improve the efficiency of the resource management system 106. In another exemplary embodiment, the processing module 210 may only identify a set of network policies corresponding to the network elements 108 and/or the communication links 114 classified as the standard category. In the event that the processing module 210 determines to deny the resource allocation request, the method 400 may proceed to block 404 where it can process new resource allocation request. Method 400 may also proceed to block 408. In the event that the processing module 210 determines to accept the resource allocation request, the processing module 210 may provide an acceptance response to the plurality of user devices 102(1-N), and the method 400 may proceed to blocks 410 or 412.

At block 408, the processing module 210 may provide a denial response to the plurality of user device 102(1-N) via the input/output (I/O) module 208 when the processing module 210 determines to deny the request for allocating network resources.

At block 409, the processing module 210 may provide a acceptance response to the plurality of user device 102(1-N) via the input/output (I/O) module 208 when the processing module 210 determines to accept the request for allocating network resources.

At block 410, the processing module 210 may determine to accept the resource allocation request, the processing module 210 may update the utilization rate of one or more network elements 108 and/or communication links 114 identified by the resource allocation request. For example, the processing module 210 may update the utilization rate of the network elements 108 and/or the communication links 114 identified by the resource allocation request in the network topology model stored in the database module 212. The immediate updating of the elements and links in the priority category within the network topology model stored in the database module 212 may be required in order to ensure the accuracy of the utilization rate of the network elements 108 and/or the communication links 114 for subsequent resource allocation requests.

At block 412, the processing module 210 may accept the resource allocation request and update utilization rate for network elements 108 and/or communication links 114 that are classified as standard category. The processing module 210 may provide an acceptance message to the plurality of user devices 102(1-N) before updating utilization rate of network elements 108 and/or the communication links 114 of the network topology model, in the standard category, stored in the database module 212. A delay (e.g., after providing acceptance response) in updating the utilization rate of the network elements 108 and/or the communication links 114 of the network topology model stored in the database module 212 may be tolerable for the network elements 108 and/or the communication links 114 classified as the standard category because the utilization rate is below the predetermined utilization rate and thus may not impact the accuracy of subsequent resource allocation requests. After transmitting an acceptance message and updating utilization rate of network elements 108 and communication links 114 that are classified as standard category in the network topology model, the method 400 may proceed to block 414.

At block 414, the processing module 210 may determine updated utilization rate of one or more network elements 108 and/or communication links 114. For example, the processing module 210 may access the database module 212 to obtain utilization rate of network elements 108 and/or the communication links 114 of the network topology model. The processing module 210 may access the database module 212 after updating the utilization rate of the network elements 108 and/or the communication links 114 of the network topology model. After, determining updated utilization rate of one or more network elements 108 and/or communication links 114, the method 400 may proceed to block 416.

At block 416, the processing module 210 may determine whether to reclassify the one or more network elements 108 and/or the communication links 114 based at least in part on the updated utilization rate. The one or more network elements 108 and/or the communication links 114 may be reclassified into a plurality of categories based at least in part on a utilization rate. In an exemplary embodiment, the one or more network elements 108 and/or the communication links 114 may have a utilization rate of 50%. After accepting the resource allocation request, the one or more network elements 108 and/or the communication links 114 may have an updated utilization rate of 90% (e.g., above a threshold utilization rate of 70%). The processing module 210 may reclassify the one or more network elements 108 and/or the communication links 114 as priority category. In another exemplary embodiment, the one or more network elements 108 and/or the communication links 114 may have a utilization rate of 50%. After accepting the resource allocation request, the one or more network elements 108 and/or the communication links 114 may have an updated utilization rate of 55% (e.g., below a threshold utilization rate of 70%). The one or more network elements 108 and/or communication links 114 may remain as standard category and the processing module 210 may not reclassify the one or more network elements 108 and/or the communication links 114. In the event that the one or more network elements 108 and/or communication links 114 are not reclassify, the method 400 may proceed to block 418.

At block 418, the processing module 210 may not change network policies associated with the one or more network elements 108 and/or communication links 114 when the one or more network elements 108 and/or communication links 114 are not reclassified.

At block 420, the processing module 210 may change network policies associated with the one or more network elements 108 and/or communication links 114 when the one or more network elements 108 and/or communication links 114 are reclassified into a different category. For example, the processing module 210 may associate network policies corresponding to the priority category to the one or more network elements 108 and/or communication links 114 when the one or more network elements 108 and/or communications links 114 are reclassified as priority category. The processing module 210 may associate network policies corresponding to the standard category to the one or more network elements 108 and/or communication links 114 when the one or more network elements 108 and/or communication links 114 are reclassified as standard category. To reduce processing time, the policy set applied to the resource allocation request may not include rules associated with network elements 108 and/or communication links 114 classified as standard category.

At block 422, the method for determining whether to accept or deny request for allocating network resource may end.

Figure 5:
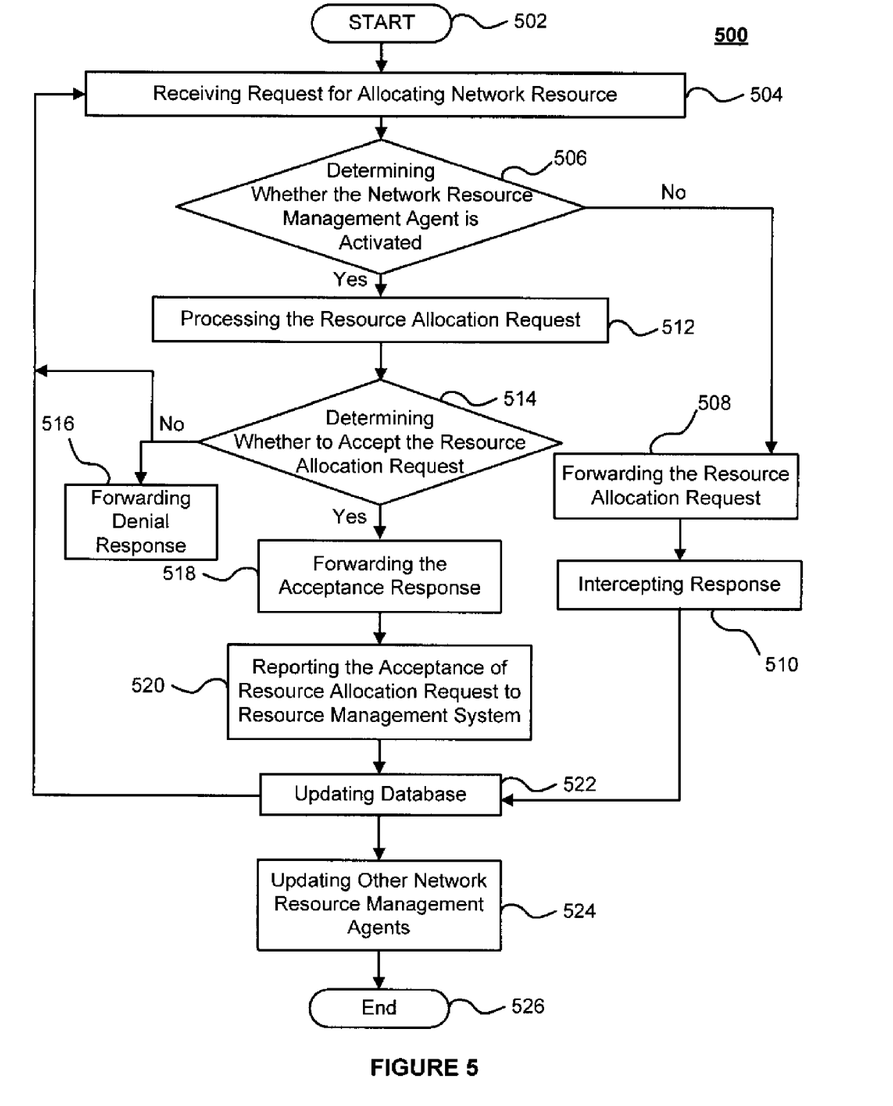
FIG. 5 is a flowchart illustrating the functionality of a network resource management agent for determining whether to accept, deny or forward a resource allocation request of a particular embodiment.

FIG. 5 is a flowchart illustrating the functionality of a network resource management agent 110 for determining whether to accept or deny a resource allocation request of a particular embodiment. This exemplary method 500 may be provided by way of example, as there are a variety of ways to carry out the method. The method 500 shown in FIG. 5 can be executed or otherwise performed by one or a combination of various systems. The method 500 is described below may be carried out by the system and network shown in FIGS. 1 and 3, by way of example, and various elements of the network resource management agent 110 and communication network 104 are referenced in explaining the example method of FIG. 5. Each block shown in FIG. 5 represents one or more processes, methods or subroutines carried out in exemplary method 500. Referring to FIG. 5, exemplary method 500 may begin at block 502.

At block 502, the method 500 for determining whether to accept, deny or forward resource allocation requests may begin.

At block 504, the agent input/output module (I/O) module 308 may receive resource allocation requests from the plurality of user devices 102(1-N). For example, the agent input/output (I/O) module 308 may be implemented or integrated with the plurality of user devices 102(1-N). The agent input/output module 308 may receive the requests for allocating network resources received by the plurality of user devices 102(1-N). In another exemplary embodiment, the agent input/output (I/O) module 308 may be implemented as separate element communicatively coupled to the plurality of user devices 102(1-N). The agent input/output (I/O) module 308 may intercept the requests for allocating network resourced transmitted by the plurality of user devices 102(1-N). The request for allocating network resources may include type of services requested (e.g., Video on Demand (VOD), IPTV, Audio/Video Conferencing, content distribution, webcast and distant learning applications). The request for allocating network resources may also include identification information associated with plurality of user devices 102(1-N), for example, IP address, media access control (MAC) address, uniform resource locator (URL), uniform resource identifiers (URI), telephone number, set-top box number, and/or other identification number associated with the plurality of user devices 102(1-N). The request for allocating network resource may further identify network resources requested, for example, a type of communication services (e.g., Internet, satellite, cable, fiber optics, telephone line), an amount of bandwidth (e.g., 15 Mbps), protocols of the network resource, one or more network elements associated with a communication path, one or more communication links along a communication path, and/or other identification information of the network resources. The request for allocating network resource may further include an identification field to help associate the request with corresponding responses. After receiving the requests for allocating network resources at the agent input/output (I/O) module 308, the method 500 may proceed to block 506.

At block 506, the agent communication module 306 may determine whether the network resource management agent 110 is activated to determine whether to accept or deny the request for allocating network resources. For example, the agent communication module 306 may receive an activation signal from the resource management system 106. The agent communication module 306 may activate the network resource management agent 110 based at least in part on the activation signal provided by the resource management system 106. In another example, the agent communication module 306 may receive a deactivation signal from the resource management system 106. The agent communication module 306 may deactivate the network resource management agent 110 based at least in part on the deactivation signal provided by the resource management system 106. In the event that the network resource management 110 is activated, the method 500 may proceed to block 512. In the event that the network resource management agent 110 is deactivated, the method 500 may proceed to block 508. Also, the network resource management agent 110 may deactivate itself based on network conditions (e.g., in the case when it decides that it can not contribute positively to the performance).

At block 508, the network resource management agent 110 may forward the resource allocation request. For example, the network resource management agent 110 may be deactivated, the agent input/output (I/O) module 308 of the network resource management agent 110(1) may forward the resource allocation request to another network resource management agent 110(2-N) implemented at one or more network elements 108 of the communication network 104. In another exemplary embodiment, the network resource management agent 110 may forward the resource allocation request to the resource management system 106 via one or more network elements 108 and/or communications links 114. After forwarding the resource allocation request, the method 500 may proceed to block 510.

At block 510, the agent network monitoring and policy module 314 may intercept the response associated with the forwarded resource allocation requests. For example, the agent network monitoring and policy module 314 may intercept a response to the resource allocation requests provided by other network resource management agents 110(2-N) or the resource management system 106. In an exemplary embodiment, the agent network monitoring and policy module 314 may match identifier information of the response with identifier information of the resource allocation requests. The agent network monitoring and policy module 314 may determine whether the resource allocation request has been accepted or denied from the response message. Also, the resource management system 106 may provide an explicit resource allocation update to the network resource management agent 110.

At block 512, the agent processing module 310 may process the requests for allocating network resources. In the event that the network resource management agent 110 is activated, the agent input/output (I/O) module 308 may provide the resource allocation requests to the agent processing module 310. The agent processing module 310 may extract information associated with the resource allocation requests. For example, the information extracted by the agent processing module 310 may include type of services requested, identification information associated with plurality of user devices 102(1-N), network resources requested, protocols of the network resource, one or more network elements 108 associated with a communication path, one or more communication links 114 along a communication path. The agent processing module 310 may filter, sort, format and/or aggregate the resource allocation requests received from the plurality of user devices 102(1-N). In an exemplary embodiment, the agent processing module 310 may include filtering the resource allocation requests and eliminating erroneous or defective resource allocation requests, sorting the resource allocation requests, formatting the resource allocation requests into desired format (e.g., identify various portions of the resource allocation requests), and aggregating the resource allocation requests received from plurality of user devices 102(1-N). After processing the requests for allocating network resource, the method 500 may proceed to block 514.

At block 514, the agent processing module 310 may determine whether to accept or deny the request for allocating network resource. The resource allocation request may be transferred from the agent input/output (I/O) module 308 to the agent processing module 310 for processing. The agent processing module 310 may process the resource allocation request to determine whether to accept or deny the resource allocation request. For example, the agent processing module 310 may identify an amount of network resource requested associated with the resource allocation request transmitted by the plurality of user devices 102(1-N). The agent processing module 310 may identify a communication path between the plurality of user devices 102(1-N) and the service provider 112 based at least in part on the resource allocation request. For example, the agent processing module 310 may identify one or more network elements 108 and/or communication links 114 along the communication path between the plurality of user devices 102(1-N) and the service provider 112.

The agent processing module 310 may identify a classification of the one or more network elements 108 and/or the communication links 114 within a threshold proximity (e.g., within 5 hops of the network resource management agent 110) of the network resource management agent 110 along the communication path between the plurality of user devices 102(1-N) and the service provider 112 based at least in part on an utilization rate. In an exemplary embodiment, the agent processing module 310 may identify network elements 108 and/or communication links 114 directly coupled to the network resource management agent 110. The agent processing module 310 may identify a utilization rate of one or more network elements 108 and/or communication links 114 along the communication path directly coupled to the network resource management agent 110. The agent processing module 310 may access the agent network monitoring and policy module 314 to identify the categorization of the one or more network elements 108 and/or the communication links 114 within the scope of the resource network management agent 110. The agent processing module 310 may determine whether to accept or deny the resource allocation request based at least in part on the categorization of the one or more network elements 108 and/or the communication links 114 within the scope of the network resource management agent 110.

In an exemplary embodiment, the agent processing module 310 may determine to accept the resource allocation request when the one or more network elements 108 and/or the communication links 114 within the scope of the network resource management agent 110 are classified as standard category. In another exemplary embodiment, the agent processing module 310 may determine to deny the resource allocation request when the one or more network elements 108 and/or the communication links 114 within the scope of the network resource management agent 110 are classified as priority category. The agent processing module 310 may allow early determination of the resource allocation request before the resource allocation request propagates to the resource management system 106. Thus, the agent processing module 310 may prevent further propagation of the resource allocation request and reduce the signaling and processing overhead at subsequent network elements 108. In the event that the agent processing module 310 determines to accept the resource allocation request, the method 500 may proceed to block 518. In the event that the agent processing module 310 determines to deny the resource allocation request, the method 500 may proceed to block 516. The method 500 may also proceed to receive new resource allocation request block 504.

At block 516, the agent processing module 310 may forward a denial response to the plurality of user device 102(1-N) via the agent input/output (I/O) module 308 when the agent processing module 310 determines to deny the request for allocating network resources. In another exemplary embodiment, the agent processing module 310 may deny the resource allocation request when the resource allocation request exceeds the maximum utilization rate of the network elements 108 and/or the communication links 114 directly coupled to the network resource management agent 110 along a communication path between the plurality of user devices 102(1-N) and the service provider 112. The early denial of the resource allocation request before the resource allocation request propagates to the resource management system 106 may prevent further propagation of the resource allocation request and reduce the signaling and processing overhead at subsequent network elements 108.

At block 518, the agent processing module 310 may forward an acceptance response to the plurality of user device 102(1-N) via the agent input/output (I/O) module 308 when the agent processing module 310 determines to accept the request for allocating network resources. In an exemplary embodiment, the agent processing module 310 may accept the resource allocation request when the resource allocation request does not exceed the maximum utilization rate of the network elements 108 and/or the communication links 114 directly coupled to the network resource management agent 110 along a communication path between the plurality of user devices 102(1-N) and the service provider 112. After forwarding an acceptance response, the method 500 may proceed to block 520.

At block 520, the agent communication module 306 may report the acceptance of the resource allocation requests to the resource management system 106. For example, the agent communication module 306 may provide a record of actions performed by the network resource management agent 110. The record may include time stamp of actions performed by the network resource management agent 110. The record may also list the actions in chronological order or classify actions by categories. The record may also include type of services requested, identification information associated with plurality of user devices 102(1-N), network resources requested, protocols of the network resource, one or more network elements 108 associated with a communication path, one or more communication links 114 along a communication path. After reporting the acceptance of resource allocation request to the resource management system 106, the method 500 may proceed to block 522.

At block 522, the agent processing module 310 may update a database of network topology model stored at the network resource management agent 110. For example, the agent processing module 310 may update a utilization rate of network elements 108 and/or communication links 114 of the network topology model stored at the agent database module 312. In an exemplary embodiment, the agent processing module 310 may update utilization rate of network elements 108 and/or communication links 114 directly coupled to the network resource management agent 110 of the network topology model stored at the agent database module 312. The method 500 may proceed to receive new resource allocation request block 504.

The agent database module 312 may also store resource allocation requests forwarded to other network resource management agent 110 or resource management system 106. For example, the agent processing module 310 may update the agent database module 312 of one or more resource allocation requests that are forwarded by the agent input/output (110) module 308 to other network resource management agents 110(2-N) and the resource management system 106. The agent network monitoring and policy module 314 may update response messages associated with the resource allocation request. The agent database module 312 may update the utilization rate of one or more network elements 108 and/or communication links 114 of network topology model stored at the agent database module 312. After updating the agent database module 312, the method 500 may proceed to block 524.

At block 524, the agent communication module 306 may report the acceptance of the resource allocation requests to other network resource management agents 110(2-N). For example, the agent communication module 306 may provide a record of actions performed by a first network resource management agent 110(1) to other network resource management agents 110(2-N). The record may include time stamp of actions performed by the network resource management agent 110. The record may also list the actions in chronological order or classify actions by categories. The record may also include type of services requested, identification information associated with plurality of user devices 102(1-N), network resources requested, protocols of the network resource, one or more network elements 108 associated with a communication path, one or more communication links 114 along a communication path. After reporting the acceptance of resource allocation request to other network resource management agents 110(2-N), the method 500 may proceed to block 524.

At block 524, the method for determining whether to accept or deny request for allocating network resource may end.

Typically, a resource allocation request may be sent to a specific destination (e.g., the resource management system) and a response from the same element may be expected back to the requester. In the case when network resource management agents are involved, the response to the resource allocation request may be sent from a network resource management agent, rather than the original destination. Since the identification of the responding network resource management agent may not be known in advance to the element or application that generated the resource allocation request, there is a need for the resource allocation process to accommodate this situation. A consideration is that the element or application which issued the resource allocation request may be able to accommodate a response from an element (e.g. an IP address) which is different from the one that the request was sent to. This may be accomplished using several different approaches. As an example, the element or application which issued the request may run a process that listens to a response from an unknown (or a set of known) IP addresses on a particular communication port (e.g., TCP or UDP port). Because the response may include an identifier, this allows the response receiver to associate the response to the appropriate request.

In the preceding specification, various preferred embodiments have been described with references to the accompanying drawings. It will, however, be evident that various modifications and changes may be made thereto, and additional embodiments may be implemented, without departing from the broader scope of invention as set forth in the claims that follow. The specification and drawings are accordingly to be regarded in an illustrative rather than restrictive sense.

I claim:

1. A method for managing resources of a network, the network comprising a plurality of network devices, the method comprising:
   receiving, at a network resource management agent, a resource allocation request sent from a first network device of the plurality of network devices, the request being for allocating network resources;
   locally determining at the first network device of the plurality of network devices, via at least one computer processor on the network resource management agent, whether to accept or deny the resource allocation request sent from the first network device based at least in part on a dynamic set of policy rules and on a classification of at least one of network elements and communication links, wherein the at least one network elements and communication links is identified based on the resource allocation request; and
   providing a determination, by the network resource management agent, of whether to accept or deny the resource allocation request to the first network device of the plurality of network devices,
   wherein the first network device of the plurality of network devices comprises the network resource management agent, and
   wherein the resource allocation request is a request for resources provided by a server remote from the first network device.

2. The method of claim 1, wherein the resource allocation request includes at least one of: type of services requested, identification information associated with the first network device, the network resources requested, protocols of the network resource, the network elements associated with a communication path, and the communication links along the communication path.

3. The method of claim 1, wherein the at least one network elements and communication links is classified based at least in part on a utilization rate of the at least one network elements and communication links.

4. The method of claim 1, further comprising updating a utilization rate of the at least one network elements and communication links based on a determination to accept the resource allocation request.

5. The method of claim 4, wherein the at least one network elements and communication links is classified as a standard category when the utilization rate of the at least one network elements and communication links is below a threshold utilization rate.

6. The method of claim 5, wherein the utilization rate of the at least one network elements and communication links is updated after providing the determination of whether to accept or deny the resource allocation request when the at least one network elements and communication links is classified as the standard category.

7. The method of claim 4, wherein the at least one network elements and communication links is classified as a priority category when the utilization rate of the at least one network elements and communication links is above a threshold utilization rate.

8. The method of claim 7, wherein the utilization rate of the at least one network elements and communication links is updated before providing the determination of whether to accept or deny the resource allocation request when the at least one network elements and communication links is classified as the priority category.

9. The method of claim 4, further comprising determining whether to reclassify the at least one network elements and communication links based at least in part on an updated utilization rate of the at least one network elements and communication links.

10. The method of claim 9, further comprising construction and application of a dynamic set of network policies based at least in part on the reclassification of the at least one network elements and communication links.

11. The method of claim 1, wherein each of the plurality of network devices has an associated network resource management agent configured to receive resource allocation requests and determine whether to accept or deny the resource allocation requests.

12. The method of claim 1, wherein the network resource management agent allows for early determination of the resource allocation request before the resource allocation request propagates to a resource management system.

13. A non-transitory computer readable media comprising code to perform the acts of the method of claim 1.

14. A system, comprising:
- an input/output module at a network resource management agent configured to receive a resource allocation request sent from a first network device of a plurality of network devices, the request being for allocating network resources provided by a server remote from the first network device; and
- a processing module at the network management agent, comprising at least one computer processor, configured to locally determine at the first network device, via the at least one computer processor, whether to accept or deny the resource allocation request based at least in part on a dynamic set of policy rules and on a classification of at least one of network elements and communication links, wherein the at least one network elements and communication links is identified based on the resource allocation request, and provide a determination of whether to accept or deny the resource allocation request to the first network device,
- wherein the first network device comprises the network resource management agent.

15. The system of claim 14, wherein the resource allocation request includes at least one of: type of services requested, identification information associated with the first network device, the network resources requested, protocols of the network resource, the network elements associated with a communication path, and the communication links along the communication path.

16. The system of claim 14, wherein the at least one network elements and communication links is classified based at least in part on a utilization rate of the at least one network elements and communication links.

17. The system of claim 14, wherein the processing module is further configured to update a utilization rate of the at least one network elements and communication links based on a determination to accept the resource allocation request.

18. The system of claim 17, wherein the at least one network elements and communication links is classified as a standard category when the utilization rate of the at least one network elements and communication links is below a threshold utilization rate.

19. The system of claim 18, wherein the utilization rate of the at least one network elements and communication links is updated after providing the determination of whether to accept or deny the resource allocation request when the at least one network elements and communication links is classified as the standard category.

20. The system of claim 17, wherein the at least one network elements and communication links is classified as a priority category when the utilization rate of the at least one network elements and communication links is above a threshold utilization rate.

21. The system of claim 20, wherein the utilization rate of the at least one network elements and communication links is updated before providing the determination of whether to accept or deny the resource allocation request when the at least one network elements and communication links is classified as the priority category.

22. The system of claim 17, wherein the processing module is further configured to determine whether to reclassify the at least one network elements and communication links based at least in part on an updated utilization rate of the at least one network elements and communication links.

* * * * *